United States Patent [19]
Kim

[11] Patent Number: 5,875,105
[45] Date of Patent: Feb. 23, 1999

[54] POWER SUPPLY APPARATUS FOR CONTROLLING ELECTRICAL ELEMENTS OF VEHICLES

[75] Inventor: Sun-Kyung Kim, Kyungsangbuk-do, Rep. of Korea

[73] Assignee: Mando Machinery Corporation, Kyonggi-do, Rep. of Korea

[21] Appl. No.: 984,669

[22] Filed: Dec. 3, 1997

[30] Foreign Application Priority Data

Apr. 9, 1997 [KR] Rep. of Korea .................. 1997-13045

[51] Int. Cl.$^6$ ...................................................... H02M 7/00
[52] U.S. Cl. ........................... 363/65; 363/142; 323/299; 307/130
[58] Field of Search ................................. 363/62, 65, 142, 363/143; 323/282, 299, 300, 351; 307/9.1, 10.1, 10.7, 130, 139, 140; 340/428; 180/274, 279

[56] References Cited

U.S. PATENT DOCUMENTS

| | | | |
|---|---|---|---|
| 4,415,964 | 11/1983 | Scharfe, Jr. | 363/142 |
| 5,006,782 | 4/1991 | Pelly | 323/225 |
| 5,404,092 | 4/1995 | Gegner | 363/65 X |
| 5,406,834 | 4/1995 | Taniguchi | 73/118.1 |

*Primary Examiner*—Peter S. Wong
*Assistant Examiner*—Y. J. Han
*Attorney, Agent, or Firm*—McAulay Nissen Goldberg Kiel & Hand, LLP

[57] ABSTRACT

An improved power supply apparatus for controlling electrical elements of a vehicle which is used for a vehicle using 12 volts as well as a vehicle using 24 volts. The apparatus includes a mode selection switching unit which is selectively switched in accordance with a voltage level inputted from a battery, a first voltage transformation unit, which is not operable when the mode selection switching unit is in the turned-on mode and is operable when the mode selection switching is in the turned-of mode, for dropping an input voltage from the battery to a predetermined level, and a second voltage transformation unit for dropping a voltage from the battery when the mode selection switching unit is in the turned-on mode and dropping an output voltage from the first voltage transformation unit to a predetermined level when the mode selection switching unit in the turned-off mode.

8 Claims, 3 Drawing Sheets

POWER SUPPLY APPARATUS FOR CONTROLLING ELECTRICAL ELEMENTS OF VEHICLES

This application is based on Application No. 97-13045 filed in Republic of Korea, the contents of which is incorporated hereinto by reference.

BACKGROUND OF THE INVENTION

1. Field of the Invention

The present invention relates to a power supply apparatus, and in particular, to an improved power supply apparatus for controlling electrical elements of a vehicle which apparatus is used for a vehicle using 12 volts as well as a vehicle using 24 volts.

2. Description of the Conventional Art

Generally, when parking a vehicle, the vehicle is moved in the backward direction.

When moving a vehicle in the backward direction, a transmission gear is positioned at a Rear position, and then a driver checks whether there is an obstacle behind the vehicle by turning his/her head to the backward direction using a rear mirror and a room mirror.

However, behind the vehicle and below a rear bumper of the vehicle, there is a non-checkable area where it is impossible to check by turning his/her head and using the rear mirror and the room mirror. If there is an obstacle in this area, the vehicle may collide with the obstacle when the vehicle is moved in the backward direction.

In order to overcome the above-described problem, a vehicle is provided with an ultrasonic sensor which is capable of sensing an obstacle placed or positioned just behind the rear portion of the vehicle. Therefore, when the vehicle is moved toward the obstacle, an alarm is issued when there is a predetermined distance between the vehicle and the sensor.

FIG. 1 illustrates a circuit diagram illustrating a conventional backward movement control apparatus. As shown therein, the conventional backward movement control apparatus includes a central processing unit (CPU) 1 for controlling an alarm when a vehicle is moved in the backward direction, an ultrasonic wave oscillator 2 for oscillating ultrasonic waves in accordance with a control of the central processing unit 1, a sensor driving unit 3 for amplifying an output signal from the ultrasonic wave oscillator 2, an ultrasonic wave sensor unit 4 for generating an ultrasonic wave in accordance with an output signal from the sensor driving unit 3 and detecting whether there is an obstacle behind the vehicle using a reflected ultrasonic wave, a wave shaping unit 5 for shaping an output signal from the ultrasonic sensor unit 4, an amplifier 6 for amplifying an output signal from the wave shaping unit 5, a comparator 7 for comparing the output signal from the amplifier 6 with a previously set reference voltage, detecting an obstacle, and inputting the detected result into the central processing unit 1, and an output interface unit 8 for driving the alarming unit 9 in accordance with a control of the central processing unit 1 and generating an alarm. Here, a power (preferably, 5 volts) is supplied to the central processing unit 1 through a power supply unit 20.

FIG. 2 illustrates a detailed circuit diagram of the power supply unit 20. A voltage of 12 volts is applied to a regulator 30 through a diode D10 and condensers C10 and C11 and then is transformed to a voltage of 5 volts. Thereafter, the voltage of 5 volts is supplied to the central processing unit 1. In the drawings, reference numerals C12 through C14 denote condensers, and R10 denotes a resistor.

In the thusly constituted conventional backward movement control apparatus, a voltage of 5 volts is applied to the central processing unit 1 through the power input unit 20. In this state, when a driver sets a transmission gear lever in the Rear mode in order to drive the vehicle in the backward direction, a backward movement signal is generated and inputted into the central processing unit 1.

Therefore, the central processing unit 1 judges the backward movement of the vehicle, controls the ultrasonic wave oscillator 2, thus oscillating ultrasonic waves.

The ultrasonic waves oscillated by the ultrasonic wave oscillator 2 are inputted into the sensor driving unit 3 and are amplified to a predetermined level and are inputted into the ultrasonic wave sensor unit 4 for driving the same.

Therefore, the ultrasonic wave sensor 4 generates ultrasonic waves and receives the reflected ultrasonic waves.

Since noises are mixed in the signals from the ultrasonic sensor unit 4, the ultrasonic waves are shaped by the wave shaping unit 5, thus filtering noises. Thereafter, the signals are amplified by the amplifier 6 and are inputted into the comparator 7. The thusly inputted signals are compared with a previously set reference voltage, and a result of the comparison is inputted into the central processing unit 1.

Thereafter, the central processing unit 1 judges whether there is an obstacle behind the vehicle based on the output signal from the comparator 7. As a result of the judgement, when an obstacle is judged to be within a predetermined range from the rear side of the vehicle, the central processing unit 1 outputs an alarm control signal, and the thusly outputted alarm control signal is inputted into the alarm unit 9 through the interface unit 8, whereby the alarming unit 9 alarms that there is an obstacle behind the vehicle.

Here, the comparator 7 judges the distances between the rear side of the vehicle and the obstacle by the distance of 110 cm, 80 cm, and 50 cm. Therefore, the alarming unit 9 generates three alarms in accordance with a control of the central processing unit 1.

However, in the conventional backward movement control apparatus for a vehicle, since the power circuit unit is provided with a power input unit for only 12 volts, it is impossible to use the backward movement control apparatus for 24 voltage units of a vehicle such as a bus, truck, or mini truck.

SUMMARY OF THE INVENTION

Accordingly, it is an object of the present invention to provide an improved power supply apparatus for controlling electrical elements of a vehicle which overcome the aforementioned problems encountered in the conventional art.

It is another object of the present invention to provide an improved power supply apparatus for controlling electrical elements of a vehicle which is used for a vehicle using 12 volts as well as a vehicle using 24 volts.

To achieve the above objects, there is provided an improved power supply apparatus for controlling electrical elements of a vehicle which includes a mode selection switching unit which is selectively switched in accordance with a voltage level inputted from a battery, a first voltage transformation unit, which is not operable when the mode selection switching unit is in the turned-on mode and is operable when the mode selection switching is in the turned-of mode, for dropping an input voltage from the battery to a predetermined level, and a second voltage transformation unit for dropping a voltage from the battery when the mode selection switching unit is in the turned-on mode and dropping an output voltage from the first voltage transformation unit to a predetermined level when the mode selection switching unit in the turned-off mode.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The power supply apparatus for electric elements of a vehicle according to the present invention will now be explained with reference to the accompanying drawings.

Figure 1:
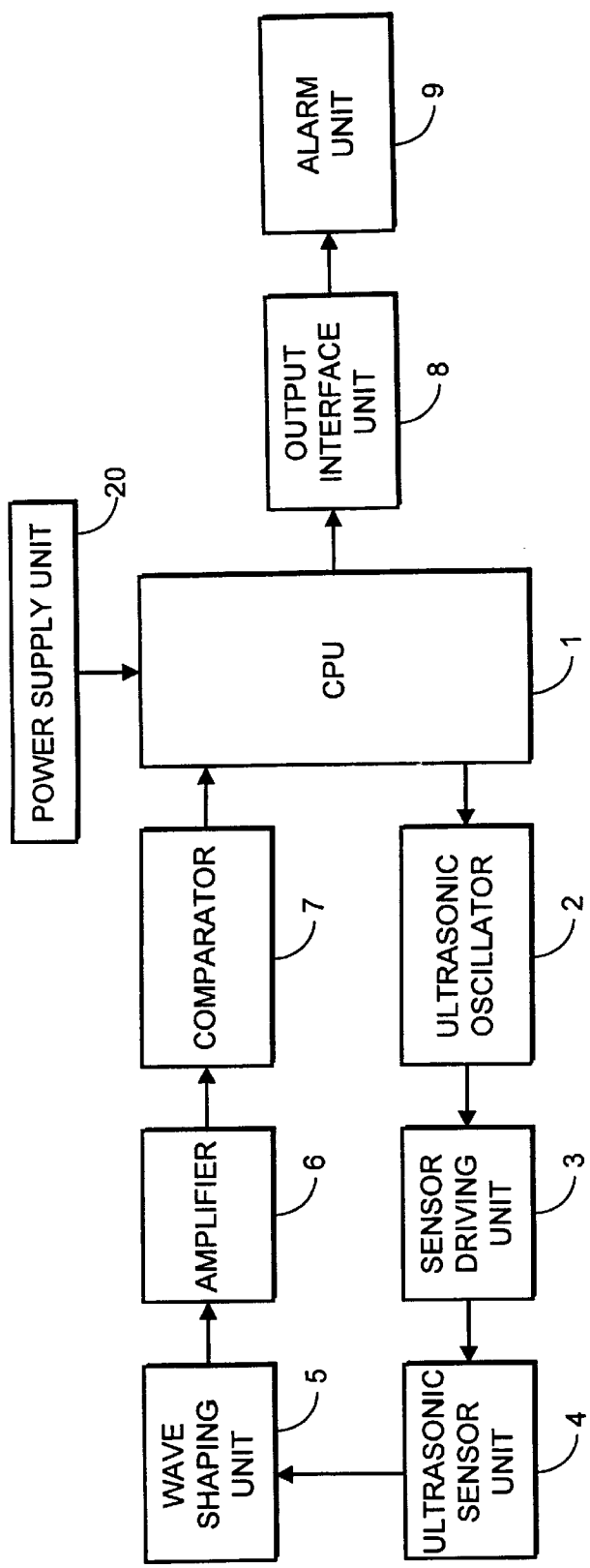
FIG. 1 is a block diagram illustrating a rear side alarming apparatus for a conventional vehicle, which uses an ultrasonic wave.
Figure 2:
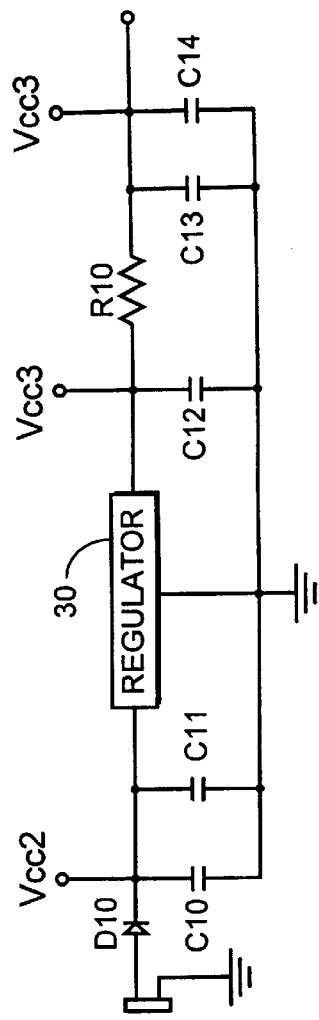
FIG. 2 is a circuit diagram illustrating a conventional power supply unit.
Figure 3:
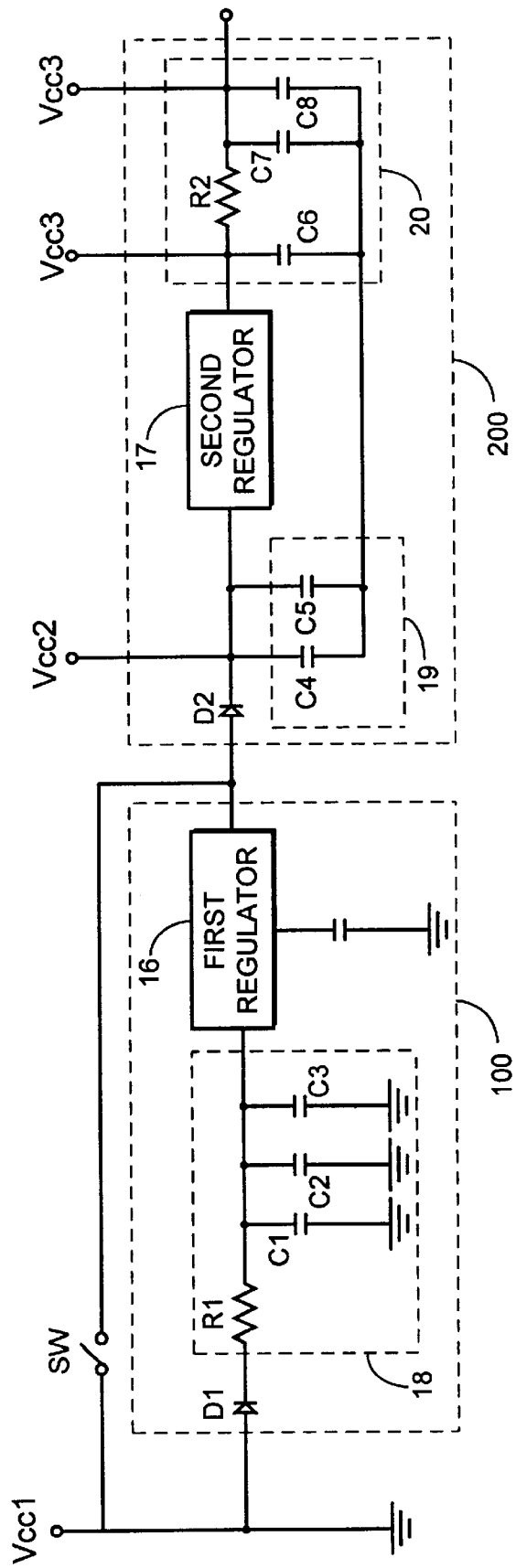
FIG. 3 is a circuit diagram illustrating a power supply unit according to the present invention.

FIG. 3 is a circuit diagram for a power supply according to the present invention. As shown therein, there are provided a switch SW, which is a mode selection switching member, for being selectively selected in accordance with a voltage level from a battery, a first voltage transformation member 100, which is not operable when the switch SW is turned on and is operable when the switch SW is turned off, for dropping the input voltage from the battery to a predetermined level voltage, and a second voltage transformation member 200 for firstly dropping the input voltage from the battery when the switch SW is turned on and secondarily dropping the output voltage from the first voltage transformation member 100 to a predetermined level when the switch SW is turned off.

In addition, the first voltage transformation member 100 includes a reversely flowing voltage prevention diode D1 for preventing a reversely flowing voltage, a first RC filter circuit having a resistor R1 and condensers C1 through C3 for smoothing the signals, thus filtering noises from the signals, and a first regulator 16 for dropping the output voltage from the first RC filter circuit 18 to a predetermined level.

In addition, the second voltage transformation member 200 includes a diode D2 connected with the first regulator 16 of the first voltage transformation member 100 for preventing a reversely flowing voltage, a filtering circuit 19 having condensers C4 and C5 for filtering the voltage signals from the reversely flowing voltage prevention diode D2, a second regulator 17 for secondarily dropping the voltage from the filtering circuit 19 to a predetermined level, and a second RC filter circuit 20 connected with the output terminal of the second regulator 17 for smoothing the output signals and filtering noises from the output signals.

Figure 4:
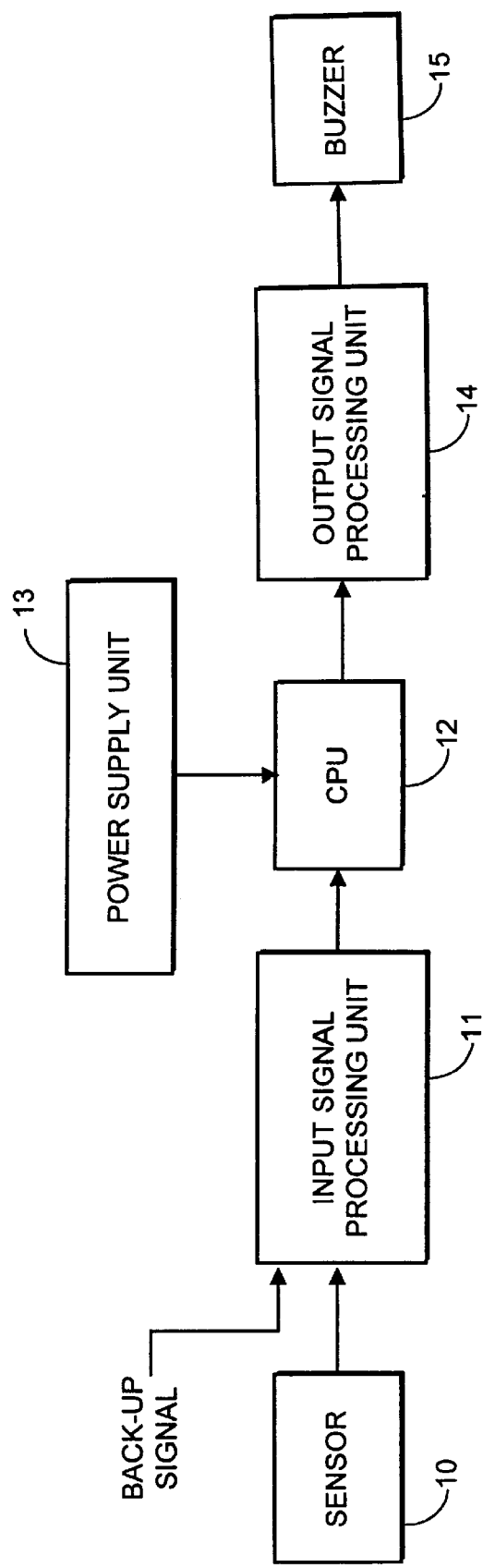
FIG. 4 is a block diagram illustrating a rear side alarming apparatus for a vehicle including a power supply apparatus according to the present invention.

FIG. 4 illustrates a block diagram of a rear side alarm apparatus for a vehicle which is equipped with a power supply apparatus according to the present invention. As shown therein, the rear side alarm apparatus for a vehicle which is equipped with a power supply apparatus according to the present invention includes an ultrasonic wave sensor 10 for generating ultrasonic wave signals for detecting whether there is an obstacle behind the rear side of the vehicle, an input signal processing unit 11 for receiving the signals outputted from the ultrasonic wave sensor 10 and then reflected on the obstacle and processing the same, a central processing unit 12 for performing a predetermined computation based on a module with respect to the signals from the input signal processing unit 11, a power supply unit 13 having switch SW and first and second voltage transformation members 100 and 200 for receiving a battery voltage, dropping the same to a predetermined level, and outputting the thusly dropped voltage to the input signals processing unit 14.

The switch SW is turned on in order to use the alarming apparatus in a vehicle using 12 volts. Here, the voltage VCC1 (12 volts) is directly inputted into the second voltage transformation member 200 not through the first voltage transformation member 100 and then is transformed to the voltage of 5 volts by the diode D2, the condensers C4 and C5 and the second regulator 17, and then is supplied to the central processing unit 12.

In addition, in the case of a truck, bus or the like which uses 24 volts, when a user turns off the switch SW, since the voltage VCC1 (24 volts) does not flow to the switch SW, the same is supplied to the first voltage transformation member 100.

Therefore, the voltage VCC1 is smoothed by the diode D1 and the RC filter circuit 18 of the first voltage transformation means 100 and noises contained therein are thereby. Thereafter, the voltage is inputted into the first regulator 16 and is transformed to a voltage of 12 volts.

In addition, the thusly transformed voltage (12 volts) is transformed to a voltage of 5 volts by the diode D2 and the condensers C4 and C5 and the second regulator 17 of the second voltage transformation member 200 and then is inputted into the central processing unit 12.

At this time, the diodes D1 and D2 are used for preventing a reversely flowing voltage, namely, from the first and second regulators 16 and 17 to the input terminal.

In the case of a vehicle using 12 volts, the switch SW is turned on, and in the case of a vehicle using 24 volts, the switch SW is turned off. Therefore, a voltage of 5 volts is always supplied to the central processing unit 12.

When a voltage of 5 volts is supplied from the power supply unit 13 to the central processing unit 12, the ultrasonic wave signals from the ultrasonic sensor 10 and the signals reflected on the object are received by the input signal processing unit 11 and then the thusly processed signals are inputted into the central processing unit 12.

Therefore, in the central processing unit 12, the signal inputted from the input signal processing unit 11 is compared with a previously set reference signal for thus judging whether there is an obstacle within a predetermined distance range from the rear side of the vehicle. When it is judged that there is an obstacle within a predetermined distance range therefrom, an alarm signal is generated. The thusly generated alarm signal is to inform the driver of a vehicle that there is an obstacle within a predetermined distance range from the rear side of the vehicle.

Here, the central processing unit 12 judges the distance between an obstacle and the rear side of the vehicle based on three intervals, namely, 110 cm, 80 cm, and 50 cm, thus generating three different alarm signals through a buzzer 15. In another preferred embodiment, different alarm sounds may be generated.

In addition, in the present invention, the power supply apparatus for controlling electrical elements of a vehicle may be used for the rear side alarm apparatus for a vehicle as well as a system which uses 12 volts and 24 volts. For example, the present invention may be applicable to a lateral side alarm apparatus, a parking system, an air cleaning apparatus for a vehicle, and the like.

As described above, the conventional apparatus is used for only a vehicle using a voltage of 12V. However, the power supply apparatus for controlling electrical elements of a vehicle according to the present invention is used for a vehicle using 12 volts as well as a vehicle using 24 volts by providing a switch which is selectively switched.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A power supply apparatus for a vehicle, comprising:

a mode selection switching means which is selectively switched in accordance with a voltage level inputted from a battery;

a first voltage transformation means, which is not operable when the mode selection switching means is in a turned-on mode and is operable when the mode selection switching means is in a turned-off mode, for dropping an input voltage from the battery to a first predetermined level; and a second voltage transformation means for dropping a voltage from the battery when the mode selection switching means is in the turned-on mode and dropping an output voltage from the first voltage transformation means to a second predetermined level when the mode selection switching means in the turned-off mode.

2. The apparatus of claim 1, wherein said first voltage transformation means includes:

a reversely flowing voltage prevention means for preventing a reversely flowing voltage;

a first RC filter circuit for smoothing an input signal and filtering a noise from the signal; and a first regulator for dropping an output from the first RC filter circuit to said first predetermined level.

3. The apparatus of claim 1, wherein said second voltage transformation means includes:

a reversely flowing voltage prevention means connected with an output terminal of a first regulator of the first voltage transformation means for preventing a reversely flowing voltage;

a filtering means connected with an output terminal of the reversely flowing voltage prevention means for filtering an input signal;

a second regulator for dropping a voltage from the filtering means to said second predetermined level; and a second RC filter circuit connected with an output terminal of the second regulator for smoothing an output signal and removing a noise from the signal.

4. The apparatus of claim 2, wherein said reversely flowing voltage prevention means is formed of a diode.

5. The apparatus of claim 3, wherein said reversely flowing voltage prevention means is formed of a diode.

6. The apparatus of claim 2, wherein said first and second RC filter circuit each include a resistor for limiting a current flow; and a plurality of condenser connected in parallel with the resistor.

7. The apparatus of claim 3, wherein said first and second RC filter circuit each include a resistor for limiting a current flow; and a plurality of condenser connected in parallel with the resistor.

8. The apparatus of claim 3, wherein said filtering means is formed of a plurality of condensers which are connected in parallel.

* * * * *